(12) United States Patent
Hartmann et al.

(10) Patent No.: US 10,513,105 B2
(45) Date of Patent: *Dec. 24, 2019

(54) DEVICE AND METHOD FOR CONSTRUCTING A LAYER BODY

(71) Applicant: VOXELJET AG, Friedberg (DE)

(72) Inventors: Andreas Dominik Hartmann, Stadtbergen (DE); Dominik Schmid, Augsburg (DE)

(73) Assignee: VOXELJET AG, Friedberg (DE)

( * ) Notice: Subject to any disclaimer, the term of this patent is extended or adjusted under 35 U.S.C. 154(b) by 340 days.

This patent is subject to a terminal disclaimer.

(21) Appl. No.: 15/487,827

(22) Filed: Apr. 14, 2017

(65) Prior Publication Data

US 2017/0217098 A1 Aug. 3, 2017

Related U.S. Application Data

(63) Continuation of application No. 14/976,586, filed on Dec. 21, 2015, now Pat. No. 9,649,812, which is a
(Continued)

(30) Foreign Application Priority Data

Jan. 5, 2011 (DE) ........................ 10 2011 007 957

(51) Int. Cl.
*B33Y 10/00* (2015.01)
*B29C 64/165* (2017.01)
(Continued)

(52) U.S. Cl.
CPC ............ *B33Y 30/00* (2014.12); *B22F 3/1055* (2013.01); *B29C 64/165* (2017.08); *B29C 64/20* (2017.08);
(Continued)

(58) Field of Classification Search
None
See application file for complete search history.

(56) References Cited

U.S. PATENT DOCUMENTS 2,640,629 A 6/1953 McDonald et al.
2,692,142 A 10/1954 Hunter
(Continued)

FOREIGN PATENT DOCUMENTS

AU 720255 B2 5/2000
CN 101146666 A 3/2008
(Continued)

OTHER PUBLICATIONS

US 4,937,420 A, 06/1990, Deckard (withdrawn)
(Continued)

*Primary Examiner* — Mary Lynn F Theisen
(74) *Attorney, Agent, or Firm* — The Dobrusin Law Firm, P.C.

(57) ABSTRACT

The invention relates to a device for constructing a laminar body from a plurality of superimposed layers of free-flowing material, in particular particulate material, and a build platform within a working area. The layers are solidified in locally predetermined regions by the action of binders and are joined together so that at least one moulded body is formed by the solidified and joined regions of the layers. The device comprises a discharging device movable back and forth over the working area in at least one discharge direction and having at least one discharge opening from which the free-flowing material can be discharged in individual superimposed layers during the movement of the discharging device.

22 Claims, 4 Drawing Sheets

Related U.S. Application Data continuation of application No. 13/883,397, filed as application No. PCT/DE2011/001850 on Oct. 14, 2011, now Pat. No. 9,242,413.

(51) Int. Cl.

| | | |
|---|---|---|
| *B29C 64/153* | (2017.01) | |
| *B33Y 30/00* | (2015.01) | |
| *B22F 3/105* | (2006.01) | |
| *B33Y 70/00* | (2015.01) | |
| *B29C 64/20* | (2017.01) | |
| *B33Y 40/00* | (2015.01) | |
| *B29K 105/16* | (2006.01) | |
| *B29K 509/00* | (2006.01) | |
| *B29C 64/35* | (2017.01) | |

(52) U.S. Cl.
CPC .............. *B33Y 10/00* (2014.12); *B33Y 70/00* (2014.12); *B29C 64/153* (2017.08); *B29C 64/35* (2017.08); *B29K 2105/16* (2013.01); *B29K 2509/00* (2013.01); *B33Y 40/00* (2014.12)

(56) References Cited

U.S. PATENT DOCUMENTS

| | | |
|---|---|---|
| 2,857,938 A | 10/1958 | Wahl |
| 3,616,969 A | 11/1971 | Koizumi |
| 3,616,972 A | 11/1971 | Christy |
| 3,815,527 A | 6/1974 | Dobbins |
| 3,884,401 A | 5/1975 | Winkler |
| 3,913,503 A | 10/1975 | Becker |
| 4,239,715 A | 12/1980 | Pratt |
| 4,279,949 A | 7/1981 | Esser |
| 4,369,025 A | 1/1983 | Von Der Weid |
| 4,575,330 A | 3/1986 | Hull |
| 4,579,252 A | 4/1986 | Wilson |
| 4,630,755 A | 12/1986 | Campbell |
| 4,665,492 A | 5/1987 | Masters |
| 4,669,634 A | 6/1987 | Leroux |
| 4,752,352 A | 6/1988 | Feygin |
| 4,752,498 A | 6/1988 | Fudim |
| 4,863,538 A | 9/1989 | Deckard |
| 4,889,433 A | 12/1989 | Pratt |
| 4,938,816 A | 7/1990 | Beaman et al. |
| 4,944,817 A | 7/1990 | Bourell et al. |
| 5,017,753 A | 5/1991 | Deckard |
| 5,031,120 A | 7/1991 | Pomerantz et al. |
| 5,047,182 A | 9/1991 | Sundback et al. |
| 5,053,090 A | 10/1991 | Beaman et al. |
| 5,059,266 A | 10/1991 | Yamane et al. |
| 5,076,869 A | 12/1991 | Bourell et al. |
| 5,120,476 A | 6/1992 | Scholz |
| 5,126,529 A | 6/1992 | Weiss et al. |
| 5,127,037 A | 6/1992 | Bynum |
| 5,132,143 A | 7/1992 | Deckard |
| 5,134,569 A | 7/1992 | Masters |
| 5,136,515 A | 8/1992 | Helinski |
| 5,140,937 A | 8/1992 | Yamane et al. |
| 5,147,587 A | 9/1992 | Marcus et al. |
| 5,149,548 A | 9/1992 | Yamane et al. |
| 5,155,324 A | 10/1992 | Deckard et al. |
| 5,156,697 A | 10/1992 | Bourell et al. |
| 5,182,170 A | 1/1993 | Marcus et al. |
| 5,204,055 A | 4/1993 | Sachs et al. |
| 5,216,616 A | 6/1993 | Masters |
| 5,248,456 A | 8/1993 | Evans, Jr. et al. |
| 5,252,264 A | 10/1993 | Forderhase et al. |
| 5,269,982 A | 12/1993 | Brotz |
| 5,284,695 A | 2/1994 | Barlow et al. |
| 5,296,062 A | 3/1994 | Bourell et al. |
| 5,316,580 A | 5/1994 | Deckard |
| 5,340,656 A | 8/1994 | Sachs et al. |
| 5,342,919 A | 8/1994 | Dickens, Jr. et al. |
| 5,352,405 A | 10/1994 | Beaman et al. |
| 5,354,414 A | 10/1994 | Feygin |
| 5,382,308 A | 1/1995 | Bourell et al. |
| 5,387,380 A | 2/1995 | Cima et al. |
| 5,398,193 A | 3/1995 | deAngelis |
| 5,431,967 A | 7/1995 | Manthiram et al. |
| 5,433,520 A | 7/1995 | Adams |
| 5,482,659 A | 1/1996 | Sauerhoefer |
| 5,490,962 A | 2/1996 | Cima et al. |
| 5,506,607 A | 4/1996 | Sanders, Jr. et al. |
| 5,518,060 A | 5/1996 | Cleary et al. |
| 5,518,680 A | 5/1996 | Cima et al. |
| 5,555,176 A | 9/1996 | Menhennett et al. |
| 5,573,055 A | 11/1996 | Melling et al. |
| 5,582,231 A | 12/1996 | Siak et al. |
| 5,597,589 A | 1/1997 | Deckard |
| 5,599,581 A | 2/1997 | Burton et al. |
| 5,601,868 A | 2/1997 | Gerhardt |
| 5,616,294 A | 4/1997 | Deckard |
| 5,637,175 A | 6/1997 | Feygin et al. |
| 5,639,070 A | 6/1997 | Deckard |
| 5,639,402 A | 6/1997 | Barlow et al. |
| 5,647,931 A | 6/1997 | Retallick et al. |
| 5,658,412 A | 8/1997 | Retallick et al. |
| 5,665,401 A | 9/1997 | Serbin et al. |
| 5,717,599 A | 2/1998 | Menhennett et al. |
| 5,730,925 A | 3/1998 | Mattes et al. |
| 5,740,051 A | 4/1998 | Sanders, Jr. et al. |
| 5,749,041 A | 5/1998 | Lakshminarayan et al. |
| 5,753,274 A | 5/1998 | Wilkening et al. |
| 5,807,437 A | 9/1998 | Sachs et al. |
| 5,824,250 A | 10/1998 | Whalen et al. |
| 5,851,465 A | 12/1998 | Bredt |
| 5,884,688 A | 3/1999 | Hinton et al. |
| 5,902,441 A | 5/1999 | Bredt et al. |
| 5,902,537 A | 5/1999 | Almquist et al. |
| 5,934,343 A | 8/1999 | Gaylo et al. |
| 5,940,674 A | 8/1999 | Sachs et al. |
| 5,943,235 A | 8/1999 | Earl et al. |
| 5,989,476 A | 11/1999 | Lockard et al. |
| 6,007,318 A | 12/1999 | Russell et al. |
| 6,036,777 A | 3/2000 | Sachs |
| 6,042,774 A | 3/2000 | Wilkening et al. |
| 6,048,188 A | 4/2000 | Hull et al. |
| 6,048,954 A | 4/2000 | Barlow et al. |
| 6,094,994 A | 8/2000 | Satake et al. |
| 6,116,517 A | 8/2000 | Heinzl et al. |
| 6,133,353 A | 10/2000 | Bui et al. |
| 6,146,567 A | 11/2000 | Sachs et al. |
| 6,147,138 A | 11/2000 | Hochsmann et al. |
| 6,155,331 A | 12/2000 | Langer et al. |
| 6,164,850 A | 12/2000 | Speakman |
| 6,165,406 A | 12/2000 | Jang et al. |
| 6,169,605 B1 | 1/2001 | Penn et al. |
| 6,193,922 B1 | 2/2001 | Ederer |
| 6,210,625 B1 | 4/2001 | Matsushita |
| 6,217,816 B1 | 4/2001 | Tang |
| 6,243,616 B1 | 6/2001 | Droscher et al. |
| 6,259,962 B1 | 7/2001 | Gothait |
| 6,270,335 B2 | 8/2001 | Leyden et al. |
| 6,305,769 B1 | 10/2001 | Thayer et al. |
| 6,316,060 B1 | 12/2001 | Elvidge et al. |
| 6,322,728 B1 | 12/2001 | Brodkin et al. |
| 6,335,097 B1 | 1/2002 | Otsuka et al. |
| 6,355,196 B1 | 3/2002 | Kotnis et al. |
| 6,375,874 B1 | 4/2002 | Russell et al. |
| 6,395,811 B1 | 5/2002 | Nguyen et al. |
| 6,401,001 B1 | 6/2002 | Jang et al. |
| 6,403,002 B1 | 6/2002 | Van Der Geest |
| 6,405,095 B1 | 6/2002 | Jang et al. |
| 6,416,850 B1 | 7/2002 | Bredt et al. |
| 6,423,255 B1 | 7/2002 | Hochsmann et al. |
| 6,436,334 B1 | 8/2002 | Hattori et al. |
| 6,467,525 B2 | 10/2002 | Herreid et al. |
| 6,476,122 B1 | 11/2002 | Leyden |
| 6,500,378 B1 | 12/2002 | Smith |
| 6,554,600 B1 | 4/2003 | Hoffmann et al. |
| 6,596,224 B1 | 7/2003 | Sachs et al. |
| 6,610,429 B2 | 8/2003 | Bredt et al. |

(56) References Cited

U.S. PATENT DOCUMENTS

| | | |
|---|---|---|
| 6,658,314 B1 | 12/2003 | Gothait |
| 6,672,343 B1 | 1/2004 | Perret et al. |
| 6,682,030 B2 | 1/2004 | Santoro et al. |
| 6,713,125 B1 | 3/2004 | Sherwood et al. |
| 6,722,872 B1 | 4/2004 | Swanson et al. |
| 6,733,528 B2 | 5/2004 | Abe et al. |
| 6,764,636 B1 | 7/2004 | Allanic et al. |
| 6,827,988 B2 | 12/2004 | Krause et al. |
| 6,830,643 B1 | 12/2004 | Hayes |
| 6,838,035 B1 | 1/2005 | Ederer et al. |
| 6,896,839 B2 * | 5/2005 | Kubo .................. B29C 64/153 264/109 |
| 7,004,222 B2 | 2/2006 | Ederer et al. |
| 7,049,363 B2 | 5/2006 | Shen |
| 7,120,512 B2 | 10/2006 | Kramer et al. |
| 7,137,431 B2 | 11/2006 | Ederer et al. |
| 7,153,463 B2 | 12/2006 | Leuterer et al. |
| 7,204,684 B2 | 4/2007 | Ederer et al. |
| 7,291,002 B2 | 11/2007 | Corp |
| 7,296,990 B2 | 11/2007 | Devos et al. |
| 7,332,537 B2 | 2/2008 | Bredt et al. |
| 7,348,075 B2 | 3/2008 | Farr et al. |
| 7,378,052 B2 | 5/2008 | Harryson |
| 7,387,359 B2 | 6/2008 | Hernandez et al. |
| 7,402,330 B2 | 7/2008 | Pfeiffer et al. |
| 7,431,987 B2 | 10/2008 | Pfeiffer et al. |
| 7,455,805 B2 | 11/2008 | Oriakhi et al. |
| 7,497,977 B2 | 3/2009 | Nielsen et al. |
| 7,597,835 B2 | 10/2009 | Marsac |
| 7,641,461 B2 | 1/2010 | Khoshnevis |
| 7,722,802 B2 | 5/2010 | Pfeiffer et al. |
| 7,807,077 B2 | 5/2010 | Ederer et al. |
| 7,736,578 B2 | 6/2010 | Ederer et al. |
| 7,748,971 B2 | 7/2010 | Hochsmann et al. |
| 7,767,130 B2 | 8/2010 | Elsner et al. |
| 7,790,096 B2 | 9/2010 | Merot et al. |
| 7,799,253 B2 | 9/2010 | Höchsmann et al. |
| 7,879,393 B2 | 2/2011 | Ederer et al. |
| 7,927,539 B2 | 4/2011 | Ederer |
| 8,020,604 B2 | 9/2011 | Hochsmann et al. |
| 8,096,262 B2 | 1/2012 | Ederer et al. |
| 8,186,415 B2 | 5/2012 | Marutani et al. |
| 8,349,233 B2 | 1/2013 | Ederer et al. |
| 8,506,870 B2 | 8/2013 | Ederer et al. |
| 8,574,485 B2 | 11/2013 | Kramer |
| 8,715,832 B2 | 5/2014 | Ederer et al. |
| 8,727,672 B2 | 5/2014 | Ederer et al. |
| 8,741,194 B1 | 6/2014 | Ederer et al. |
| 8,911,226 B2 | 12/2014 | Gunther et al. |
| 8,951,033 B2 | 2/2015 | Höchsmann et al. |
| 8,956,144 B2 | 2/2015 | Grasegger et al. |
| 8,992,205 B2 | 3/2015 | Ederer et al. |
| 9,327,450 B2 | 5/2016 | Hein et al. |
| 2001/0045678 A1 | 11/2001 | Kubo et al. |
| 2001/0050031 A1 | 12/2001 | Bredt et al. |
| 2002/0015783 A1 | 2/2002 | Harvey |
| 2002/0016387 A1 | 2/2002 | Shen |
| 2002/0026982 A1 | 3/2002 | Bredt et al. |
| 2002/0079601 A1 | 6/2002 | Russell et al. |
| 2002/0090410 A1 | 7/2002 | Tochimoto et al. |
| 2002/0111707 A1 | 8/2002 | Li et al. |
| 2002/0155254 A1 | 10/2002 | McQuate et al. |
| 2002/0167100 A1 | 11/2002 | Moszner et al. |
| 2003/0004599 A1 | 1/2003 | Herbak |
| 2003/0083771 A1 | 5/2003 | Schmidt |
| 2003/0114936 A1 | 6/2003 | Sherwood et al. |
| 2004/0003738 A1 | 1/2004 | Imiolek et al. |
| 2004/0012112 A1 | 1/2004 | Davidson et al. |
| 2004/0025905 A1 | 2/2004 | Ederer et al. |
| 2004/0026418 A1 | 2/2004 | Ederer et al. |
| 2004/0035542 A1 | 2/2004 | Ederer et al. |
| 2004/0036200 A1 | 2/2004 | Patel et al. |
| 2004/0038009 A1 | 2/2004 | Leyden et al. |
| 2004/0045941 A1 | 3/2004 | Herzog et al. |
| 2004/0056378 A1 | 3/2004 | Bredt et al. |
| 2004/0094058 A1 | 5/2004 | Kasperchik et al. |
| 2004/0104515 A1 | 6/2004 | Swanson et al. |
| 2004/0112523 A1 | 6/2004 | Crom |
| 2004/0145088 A1 | 7/2004 | Patel et al. |
| 2004/0170765 A1 | 9/2004 | Ederer et al. |
| 2004/0187714 A1 | 9/2004 | Napadensky et al. |
| 2004/0207123 A1 | 10/2004 | Patel et al. |
| 2004/0239009 A1 | 12/2004 | Collins et al. |
| 2005/0003189 A1 | 1/2005 | Bredt et al. |
| 2005/0017386 A1 | 1/2005 | Harrysson |
| 2005/0017394 A1 | 1/2005 | Hochsmann et al. |
| 2005/0074511 A1 | 4/2005 | Oriakhi et al. |
| 2005/0079086 A1 | 4/2005 | Farr |
| 2005/0093194 A1 | 5/2005 | Oriakhi et al. |
| 2005/0167872 A1 | 8/2005 | Tsubaki et al. |
| 2005/0174407 A1 | 8/2005 | Johnson et al. |
| 2005/0179167 A1 | 8/2005 | Hachikian |
| 2005/0212163 A1 | 9/2005 | Bausinger et al. |
| 2005/0218549 A1 | 10/2005 | Farr et al. |
| 2005/0219942 A1 | 10/2005 | Wallgren |
| 2005/0276976 A1 | 12/2005 | Pfeifer et al. |
| 2005/0280185 A1 | 12/2005 | Russell et al. |
| 2006/0012058 A1 | 1/2006 | Hasei |
| 2006/0103054 A1 | 5/2006 | Pfeifer et al. |
| 2006/0105102 A1 | 5/2006 | Hochsmann et al. |
| 2006/0159896 A1 | 7/2006 | Pfeifer et al. |
| 2006/0175346 A1 | 8/2006 | Ederer et al. |
| 2006/0208388 A1 | 9/2006 | Bredt et al. |
| 2006/0237159 A1 | 10/2006 | Hochsmann |
| 2006/0251535 A1 | 11/2006 | Pfeifer et al. |
| 2006/0254467 A1 | 11/2006 | Farr et al. |
| 2006/0257579 A1 | 11/2006 | Farr et al. |
| 2007/0045891 A1 | 3/2007 | Martinoni et al. |
| 2007/0057412 A1 | 3/2007 | Weiskopf et al. |
| 2007/0126157 A1 | 6/2007 | Bredt |
| 2007/0215020 A1 | 9/2007 | Miller |
| 2007/0238056 A1 | 10/2007 | Baumann et al. |
| 2007/0241482 A1 | 10/2007 | Giller et al. |
| 2007/0245950 A1 | 10/2007 | Teulet |
| 2008/0001331 A1 | 1/2008 | Ederer |
| 2008/0003390 A1 | 1/2008 | Hayashi et al. |
| 2008/0018018 A1 | 1/2008 | Nielsen et al. |
| 2008/0047628 A1 | 2/2008 | Davidson et al. |
| 2008/0138515 A1 | 6/2008 | Williams |
| 2008/0187711 A1 | 8/2008 | Alam et al. |
| 2008/0233302 A1 | 9/2008 | Elsner et al. |
| 2008/0241404 A1 | 10/2008 | Allaman et al. |
| 2008/0260945 A1 | 10/2008 | Ederer et al. |
| 2008/0299321 A1 | 12/2008 | Ishihara |
| 2009/0011066 A1 | 1/2009 | Davidson et al. |
| 2009/0068376 A1 | 3/2009 | Philippi et al. |
| 2010/0007048 A1 | 1/2010 | Schweininger et al. |
| 2010/0007062 A1 | 1/2010 | Larsson et al. |
| 2010/0026743 A1 | 2/2010 | Van Thillo et al. |
| 2010/0207288 A1 | 8/2010 | Dini |
| 2010/0212584 A1 | 8/2010 | Ederer et al. |
| 2010/0243123 A1 | 9/2010 | Voxeljet |
| 2010/0244301 A1 | 9/2010 | Ederer et al. |
| 2010/0247742 A1 | 9/2010 | Shi et al. |
| 2010/0272519 A1 | 10/2010 | Ederer et al. |
| 2010/0279007 A1 | 11/2010 | Briselden et al. |
| 2010/0291314 A1 | 11/2010 | Kashani-Shirazi |
| 2010/0323301 A1 | 12/2010 | Tang |
| 2011/0049739 A1 | 3/2011 | Uckelmann et al. |
| 2011/0059247 A1 | 3/2011 | Kuzusako et al. |
| 2011/0177188 A1 | 7/2011 | Bredt et al. |
| 2011/0223437 A1 | 9/2011 | Ederer et al. |
| 2012/0046779 A1 | 2/2012 | Pax et al. |
| 2012/0094026 A1 | 4/2012 | Ederer et al. |
| 2012/0097258 A1 | 4/2012 | Hartmann et al. |
| 2012/0113439 A1 | 5/2012 | Ederer et al. |
| 2012/0126457 A1 | 5/2012 | Abe et al. |
| 2012/0291701 A1 | 11/2012 | Grasegger et al. |
| 2013/0000549 A1 | 1/2013 | Hartmann et al. |
| 2013/0004610 A1 | 1/2013 | Hartmann et al. |
| 2013/0026680 A1 | 1/2013 | Ederer et al. |
| 2013/0029001 A1 | 1/2013 | Gunther et al. |
| 2013/0199444 A1 | 8/2013 | Hartmann |
| 2013/0234355 A1 | 9/2013 | Hartmann et al. |

(56) References Cited

U.S. PATENT DOCUMENTS

| | | |
|---|---|---|
| 2013/0302575 A1 | 11/2013 | Mogele et al. |
| 2013/0313757 A1 | 11/2013 | Kashani-Shirazi |
| 2014/0048980 A1 | 2/2014 | Crump et al. |
| 2014/0065194 A1 | 3/2014 | Yoo et al. |
| 2014/0202381 A1 | 7/2014 | Ederer et al. |
| 2014/0212677 A1 | 7/2014 | Gnuchtel et al. |
| 2014/0227123 A1 | 8/2014 | Gunster |
| 2014/0271961 A1 | 9/2014 | Khoshnevis |
| 2014/0306379 A1 | 10/2014 | Hartmann et al. |
| 2014/0322501 A1 | 10/2014 | Ederer et al. |
| 2015/0042018 A1 | 2/2015 | Gunther et al. |
| 2015/0110910 A1 | 4/2015 | Hartmann et al. |
| 2015/0165574 A1 | 6/2015 | Ederer et al. |
| 2015/0210822 A1 | 7/2015 | Ederer et al. |
| 2015/0224718 A1 | 8/2015 | Ederer et al. |
| 2015/0266238 A1 | 9/2015 | Ederer et al. |
| 2015/0273572 A1 | 10/2015 | Ederer et al. |
| 2015/0290881 A1 | 10/2015 | Ederer et al. |
| 2015/0375418 A1 | 12/2015 | Hartmann |
| 2015/0375419 A1 | 12/2015 | Gunther et al. |
| 2016/0001507 A1 | 1/2016 | Hartmann et al. |
| 2016/0052165 A1 | 2/2016 | Hartmann |
| 2016/0052166 A1 | 2/2016 | Hartmann |
| 2016/0107386 A1 | 4/2016 | Hartmann et al. |
| 2016/0114533 A1 | 4/2016 | Grassegger et al. |
| 2016/0263828 A1 | 9/2016 | Ederer et al. |
| 2016/0303762 A1 | 10/2016 | Gunther |
| 2016/0311167 A1 | 10/2016 | Gunther et al. |
| 2016/0311210 A1 | 10/2016 | Gunther et al. |
| 2016/0318251 A1 | 11/2016 | Ederer et al. |
| 2017/0050378 A1 | 2/2017 | Ederer |
| 2017/0106595 A1 | 4/2017 | Gunther et al. |
| 2017/0151727 A1 | 6/2017 | Ederer et al. |
| 2017/0157852 A1 | 6/2017 | Ederer et al. |
| 2017/0182711 A1 | 6/2017 | Gunther et al. |
| 2017/0210037 A1 | 7/2017 | Ederer et al. |
| 2017/0297263 A1 | 10/2017 | Ederer et al. |
| 2017/0305139 A1 | 10/2017 | Hartmann |
| 2017/0355137 A1 | 12/2017 | Ederer et al. |
| 2018/0079133 A1 | 3/2018 | Ederer et al. |
| 2018/0141271 A1 | 5/2018 | Gunther et al. |
| 2018/0326662 A1 | 11/2018 | Gunther et al. |
| 2018/0369910 A1 | 12/2018 | Gunther et al. |
| 2019/0047218 A1 | 2/2019 | Ederer et al. |
| 2019/0084229 A1 | 3/2019 | Gunther |

FOREIGN PATENT DOCUMENTS

| | | |
|---|---|---|
| DE | 3221357 A1 | 12/1983 |
| DE | 3930750 C2 | 3/1991 |
| DE | 4305201 C1 | 4/1994 |
| DE | 4300478 | 8/1994 |
| DE | 4 325 573 | 2/1995 |
| DE | 29506204 U1 | 6/1995 |
| DE | 4 400 523 | 7/1995 |
| DE | 4440397 | 9/1995 |
| DE | 19530295 C1 | 1/1997 |
| DE | 19528215 A1 | 2/1997 |
| DE | 29701279 U1 | 5/1997 |
| DE | 19545167 A1 | 6/1997 |
| DE | 69031808 T2 | 4/1998 |
| DE | 19853834 | 5/2000 |
| DE | 100 53 741 C1 | 2/2002 |
| DE | 100 47 614 A1 | 4/2002 |
| DE | 101 05 504 A1 | 8/2002 |
| DE | 10 117 875 | 1/2003 |
| DE | 10 216 013 A1 | 10/2003 |
| DE | 69634921 T2 | 12/2005 |
| DE | 201 22 639 U1 | 11/2006 |
| DE | 102006040305 A1 | 3/2007 |
| DE | 10 2005 056 260 A1 | 6/2007 |
| DE | 102006029298 A1 | 12/2007 |
| DE | 102006030350 A1 | 1/2008 |
| DE | 102007040755 A1 | 3/2009 |
| DE | 102007047326 A1 | 4/2009 |
| DE | 10 2009 030 113 A1 | 12/2010 |
| DE | 102011053205 A1 | 3/2013 |
| EP | 0 224 621 A1 | 6/1987 |
| EP | 0 318 247 A1 | 5/1989 |
| EP | 0361847 B1 | 4/1990 |
| EP | 0431924 A2 | 6/1991 |
| EP | 0688262 | 12/1995 |
| EP | 0739666 | 10/1996 |
| EP | 0644809 B1 | 7/2001 |
| EP | 1415792 | 5/2004 |
| EP | 1442870 | 8/2004 |
| EP | 1457590 A | 9/2004 |
| EP | 1872928 A1 | 1/2008 |
| FR | 2790418 | 9/2000 |
| GB | 2297516 A | 8/1996 |
| GB | 2382798 | 11/2003 |
| JP | S62275734 A | 11/1987 |
| JP | 2003/136605 A | 5/2003 |
| JP | 2004/082206 A | 3/2004 |
| JP | 2009/202451 A | 9/2009 |
| WO | 90/03893 A1 | 4/1990 |
| WO | 4102260 A1 | 7/1992 |
| WO | 1995/018715 A1 | 7/1995 |
| WO | 1995/034468 A1 | 12/1995 |
| WO | 1996/005038 A1 | 2/1996 |
| WO | 1998/028124 A2 | 7/1998 |
| WO | 2000/021736 A1 | 4/2000 |
| WO | 2000/051809 A1 | 9/2000 |
| WO | 2000/078485 A2 | 12/2000 |
| WO | 2001/026885 A1 | 4/2001 |
| WO | 2001/034371 A2 | 5/2001 |
| WO | 01/40866 A2 | 6/2001 |
| WO | 2001/072502 A1 | 10/2001 |
| WO | 2001/096048 A1 | 12/2001 |
| WO | 2002/026419 A1 | 4/2002 |
| WO | 2002/026420 A1 | 4/2002 |
| WO | 2002/064353 A1 | 8/2002 |
| WO | 2002/064354 A1 | 8/2002 |
| WO | 2002/083323 A2 | 10/2002 |
| WO | 2003/016030 A1 | 2/2003 |
| WO | 2003/016067 A2 | 2/2003 |
| WO | 2003/086726 A1 | 10/2003 |
| WO | 2003/097518 A2 | 11/2003 |
| WO | 2003/103932 A1 | 12/2003 |
| WO | 2004/010907 A1 | 2/2004 |
| WO | 2004/014637 A1 | 2/2004 |
| WO | 2004/112988 A2 | 12/2004 |
| WO | 2005/080010 A1 | 9/2005 |
| WO | 2005/082603 A1 | 9/2005 |
| WO | 2005/097476 A2 | 10/2005 |
| WO | 2005/113219 A1 | 12/2005 |
| WO | 2006/100166 A1 | 9/2006 |
| WO | 2007/039450 A1 | 4/2007 |
| WO | 2008/022615 A2 | 2/2008 |
| WO | 2008/049384 A1 | 5/2008 |
| WO | 2008/055615 A1 | 5/2008 |
| WO | 2008/061520 A2 | 5/2008 |
| WO | 2009/037550 A2 | 3/2009 |
| WO | 2010/149133 A1 | 12/2010 |
| WO | 2011/063786 A1 | 6/2011 |
| WO | 2011/067352 A2 | 6/2011 |
| WO | 2011/120505 A1 | 10/2011 |
| WO | 2011/127900 A2 | 10/2011 |
| WO | 2013/075696 A1 | 5/2013 |
| WO | 2014/090207 A | 6/2014 |
| WO | 2014/166469 A1 | 10/2014 |
| WO | 2004/108398 A1 | 12/2014 |
| WO | 2016/019942 A1 | 2/2016 |
| WO | 2017/008777 A1 | 1/2017 |

OTHER PUBLICATIONS

Cima et al., "Computer-derived Microstructures by 3D Printing: Bio-and Structural Materials," SFF Symposium, Austin, TX, 1994.

Sachs et al., "Three-Dimensional Printing: Rapid Tooling and Prototypes Directly from a CAD Model", Massachusetts Institute of Technology, pp. 131-136.

(56) References Cited

OTHER PUBLICATIONS

Sachs et al., "Three-Dimensional Printing: Rapid Tooling and Prototypes Directly from a CAD Model", Massachusetts Institute of Technology, pp. 143-151, Jan. 1990.
Jacobs et al., 2005 SME Technical Paper, title "Are QuickCast Patterns Suitable for Limited Production?".
Feature Article—Rapid Tooling—Cast Resin and Sprayed Metal Tooling by Joel Segal, Apr. 2000.
Williams, "Feasibility Study of Investment Casting Pattern Design by Means of Three Dimensional Printing", Department of Mechanical Engineering, pp. 2-15, Jun. 1987.
Gebhart, Rapid Prototyping, pp. 118-119, 1996.
Marcus et al., Solid Freeform Fabrication Proceedings, Nov. 1993.
Marcus, et al., Solid Freeform Fabrication Proceedings, Sep. 1995, p. 130-133.
International Search Report, Application No. PCT/DE2011/001850 dated May 21, 2012.
Co-pending U.S. Appl. No. 14/292,961, filed Jun. 2, 2014, published as US2014/0322501 A1.
Co-pending U.S. Appl. No. 13/327,856, filed Dec. 16, 2011, published as US2012/0094026 A1.
Co-pending U.S. Appl. No. 12/377,137, filed Aug. 7, 2007, published as US2010/0291314 A1.
Co-pending U.S. Appl. No. 13/957,915, filed Aug. 2, 2013, published as US2013/0313757 A1.
Co-pending U.S. Appl. No. 14/250,838, filed Apr. 11, 2014, published as US 2014/0202381 A1.
Co-pending U.S. Appl. No. 14/633,756, filed Feb. 27, 2015, published as US2015/0165574 A1.
Co-pending U.S. Appl. No. 14/547,676, filed Nov. 19, 2014 (continuation of U.S. Pat. No. 8,956,144).
Co-pending U.S. Appl. No. 13/583,989, filed Mar. 28, 2011, published as US2013/0004610 A1.
Co-pending U.S. Appl. No. 13/640,126, filed Apr. 11, 2011, published as US2013/0029001.
Armin Scharf, "Erster 3D-Endlosdrucker", zwomp.de, http://www.zwomp.de/2012/11/06/voxeljet-endlosdrucker/ dated Nov. 6, 2012.
EOS Operating Manual for Laser Sintering Machine with Brief Summary Feb. 22, 2005.
Screen shots of URL: http://www.youtube.com/watch?v=hgIrNXZjIxU taken in approximately 5 second intervals on Nov. 12, 2015.

* cited by examiner

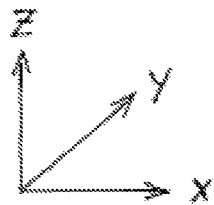

DEVICE AND METHOD FOR CONSTRUCTING A LAYER BODY

CLAIM OF PRIORITY

This application is a continuation of U.S. patent application Ser. No. 14/976,586 filed on Dec. 21, 2015 and further claims priority to U.S. patent application Ser. No. 13/883,397 filed on May 3, 2103 (now U.S. Pat. No. 9,242,413), International Patent Application PCT/DE2011/001850 filed on Oct. 14, 2011, and German Patent Application DE 10 2011 007957.2 filed on Jan. 5, 2011, the contents of which are each incorporated herein by reference in its entirety.

BACKGROUND INFORMATION

The invention relates to a device and a method for constructing a layer body from a plurality of superimposed layers of free-flowing material, in particular particulate material, on a build platform within a build space, the layers being solidified and joined together in locally predetermined areas by the action of a binder so that at least one molding is formed by the solidified and joined areas of the layers, the device comprising a discharging device which is movable back and forth over the build space in at least one discharge direction and which has at least one discharge opening from which the free-flowing material is dischargeable in individual superimposed layers during the movement of the discharging device.

A computer-controlled method for producing three-dimensional moldings is described in EP 0 431 924 B1. Free-flowing particulate material is applied in a thin layer to a build space which is surrounded, as appropriate, by container walls and applied to a build platform, and a binder is selectively printed thereon, using a print head, according to computer data. The particle area onto which the binder is printed sticks together and solidifies under the influence of the binder and, if necessary, an additional hardener. The build platform is then lowered by a distance of one layer thickness into a build cylinder and provided with a new layer of particulate material, which is also printed as described above.

These steps are repeated until the desired height of the molding is achieved. A three-dimensional object is thus produced from the printed and solidified areas.

After it is completed, the molding produced from solidified particulate material is embedded in loose particulate material and is subsequently removed therefrom. This is done, for example, using an extractor. This leaves the desired molding, from which the remaining adhering particles are removed, for example by brushing.

Other powder-supported rapid prototyping processes work in an identical or similar manner, for example, selective laser sintering or electron beam sintering, in which a loose particulate material is also applied in layers and selectively solidified with the aid of a controlled physical radiation source. The aforementioned method is summarized under the term, "three-dimensional printing" or "3D printing."

However, the provision of a build container or build cylinder having a build platform which may be lowered vertically into the build container requires a high degree of technical complexity for sealing the build container wall against the build platform to prevent uncontrolled outflow of the particulate material through the gap between the build platform and the build container wall. Another disadvantage of a lowerable build platform is the constantly increasing weight to be moved on the build platform as the building process progresses. In particular during application of another layer, it may be necessary to lower the build platform by a distance of more than one layer thickness and then to raise it again to the dimension required in order to adjust the layer thickness with sufficient accuracy.

In a reversing operation of this type, not only does the entire weight of the power feedstock, including the build platform, need to be overcome but also the friction forces between the power bed and the build container wall. This results in high stresses on the guides and drives of a vertically moving build platform, in particular in the case of large build spaces and high feedstock densities.

In contrast, EP 1 872 928 A1 proposes to raise the discharging device and the print head relative to the build platform instead of lowering the build platform relative to the discharging device and print head for building larger three-dimensional moldings as the layering process progresses. This publication furthermore proposes to construct solid walls made of particulate material by solidifying the edge areas of the applied particulate material and by forming, from these walls, a build space-delimiting build container in whose inner chamber moldings of a selective size and shape may be constructed. It is alternatively proposed to construct moldings on the build space in a free-standing manner without using a build container for encompassing and supporting previously applied layers. For this purpose, the discharging device is designed as a dosing device which may undergo controlled activation and deactivation for the controlled output of a predetermined, preferably constant, linear volume flow of particulate material per length unit and per time unit, so that particulate material is not unnecessarily strewn around the molding to be built or is not "emptied" prematurely and thus does not lose its function while the layer is being deposited. However, such dosing-controlled and "intelligent" discharging devices have a relatively complex structure and are correspondingly expensive.

"Unintelligent" discharging devices of a simpler design, on the other hand, are unable to selectively dose particulate material or are not switchable. For example, they include a scraper moving in the discharge direction or a counter-rotating roller or an oscillating blade.

These devices then distribute a quantity of material in front of the discharging device on the build space in the discharge direction. The amount of particulate material then has to be sufficiently measured before the discharging device travels over the build space.

Other design shapes may guide a quantity of material in two directions around the surface to be coated. These include discharging devices which comprise a simple, elongated hopper which has a slot on the underside as the discharge opening for discharging particulate material. In another embodiment, at least one of the two hopper walls, for example, is replaced by a counter-rotating roller.

In order for the process to progress as described, the discharging device must pass completely over the area to be coated. However, a discharging device according to the aforementioned, simple and "unintelligent" design, loses a remaining quantity of material in front of the discharging device in the discharge direction once the edge of the build space has been reached. This quantity of material would then be unavailable for the remaining building process. Nevertheless, it would be desirable to return this lost material to the discharging device for further layering.

A possibility for largely avoiding lost material is known, for example, from US 2005/0280185 A. In this publication, the quality of particulate material in the discharging device is predetermined by a sensor system.

The discharging device carries along a predetermined material quantity which is sufficient for coating the desired surface without producing too many waste particles after passing over the edge of the build space. In this case, however, the quantity must be very precisely determined to avoid too small a dosing in each cases, which would result in insufficient layering. The continuous decrease in the quantity of material in the discharging device during travel has proven to be another disadvantage of this method, resulting in an unsteady coating process. This may cause the feedstock density to be greater at the beginning of discharging device travel than at the end of the travel, due to the greater weight of the material, when a residual amount is left over in the discharging device.

In contrast, the object of the invention is to refine a method and a device of the aforementioned type in such a way that a variable and coating material-saving adjustment of the build space size is possible while simultaneously maintaining high coating quality, despite a simple and cost-effective design of the discharging device.

SUMMARY OF THE INVENTION

The invention is based on the idea that no free-flowing material or particulate material may flow out or be discharged through the discharge opening of a non-switchable discharging device, i.e., an "unintelligent" discharging device which has no way to turn the material flow through the discharge opening on and off, when the discharge opening is closed by a body which is located on an appropriate level and over which the discharging device passes.

A body of this type then simulates an already discharged layer of free-flowing material, which prevents further discharge of material when this layer reaches the same level as the discharge opening of the discharging device. In this case, after all, the discharge opening has already been closed by the already discharged layer.

By designing the body or the build platform to be able to change at least the vertical position of the body in relation to the build platform, the size of the build space may be easily limited by the body without requiring a build container which is laboriously adjusted to the particular size of the build space. When the discharging device with its discharge opening comes into contact with the surface of the body, which is suitably placed on the edge of the build space in the vertical direction, the body closes the discharge opening, whereby no more free-flowing material is dischargeable at the edge of the build space.

Alternatively or additionally, the body is designed in such a way that it does not close the discharge opening but instead has means such as an opening to be controllably opened or closed, for example, for the purpose of discharging or conducting free-flowing material that is not used for layering from the discharge opening into a collecting container, so that it may be fed back into the layering process.

According to the invention, it is therefore proposed that at least one body delimiting the build space in at least one discharge direction of the discharging device and the build platform are vertically adjustable relative to each other according to the particular progress with which the layer body is being constructed, in such a way that a surface of the body facing the discharge opening is aligned flush with a topmost layer of the layer body which is yet to be produced or has already been produced, in order to close the discharge opening of discharging device and to prevent the discharging device from discharging free-flowing material or to discharge free-flowing material not used for layering into a collecting container when the discharge opening is located above the body.

It is advantageous that, even when using an "unintelligent," non-switchable, non-dosing and only displacement-controlled discharging device, it is possible to discharge free-flowing material only within the build space delimited by the body and to avoid, in particular, discharging material in the area of the build platform located outside the build space. As a result, it is not necessary to remove residual material located outside the build space, which has a positive effect on the costs. The option of using an "unintelligent," non-switchable, non-dosing and only displacement-controlled discharging device in connection with the invention also helps lower costs because a discharging device of this type is much more cost-effective than an "intelligent" discharging device. An only displacement-controlled and "unintelligent" discharging device is understood to be a discharging device which travels a certain computer-controlled discharge route, for example from a starting position to a reversing position, and which discharges or permits the outflow of free-flowing material along this discharge route and through the always open discharge opening onto the build space. In particular, the discharging device does not have any means of closing the discharge opening or, for instance, dosing the quantity of free-flowing material to be discharged, depending on the traveling distance.

Advantageous refinements of and improvements to the invention specified in the independent claims are made possible by the measures discussed in the dependent claims.

It is particularly advantageous if the at least one body is designed to be adjustable within a horizontal plane parallel to the build platform for the purpose of variably delimiting the build space. The areal extension of the build space may then be delimited by the at least one body, in particular if one body is disposed in one discharge direction of the discharging device (e.g., the X direction) and another body is displayed in a discharge direction perpendicular thereto (e.g., the Y direction) in order to achieve a delimited build space in both directions.

This ensures that a discharge of free-flowing material beyond the edges of the build space no longer occurs in both directions.

As mentioned above, the discharging device is preferably an "unintelligent" discharging device and only displacement-controlled with regard to a predefined discharge distance extending from a starting position at one edge of the build space to a reversing position at the opposite edge of the build space. This additionally lowers costs.

The reversing position may be predefined by the particular position of the at least one body, and the starting position is stationary. In this case, the coating operation is started from a stationary starting position, and the reversing position is defined as a function of the position of the at least one body on the horizontal plane.

Conversely, however, the starting position may be predefined by the particular position of the at least one body, and the reversing position is stationary. In this case, the coating operation is started from the at least one body and its direction is reversed at the stationary reversing position. In both cases, the length of the discharge route to be traveled by the discharging device and thus the extension of the build space in this direction depends on the position of the at least one body.

The starting position of the discharging device, i.e., the place from which the discharging operation is started, is particularly preferably a filling position in which the discharging device may be filled or refilled with free-flowing material by means of a filling device. Depending on whether the starting position is or is not dependent on the position of the at least one body, the position of the filling device on a horizontal plane parallel to the build platform is therefore also dependent on the position of the body. The filling device is then positioned, for example, above the discharging device.

The container for collecting excess material is disposed, for example, at the reversing position or at the starting position. One body may then be disposed at the starting position and at least one other body may be disposed at the reversing position, means being provided in the one body or in the other body for introducing free-flowing material into the collecting container or for conducting it thereto. The one body closing the discharge opening of the discharging device is then used to prevent a discharge of free-flowing material at the edge of the build space, while the purpose of the other body on the opposite edge of the build space is to introduce excess, i.e., unused, free-flowing material into the collecting container, so that it may be supplied for reuse in the layering process.

The at least one body is preferably a flat, plate-shaped body, for example a metal plate with or without a through-opening, depending on whether it is to prevent a discharge from the discharge opening of the discharging device or whether it is to discharge material into the collecting container.

It is therefore particularly preferable to design the build platform to be adjustable vertically relative to the body and discharging device and to design the body and the discharging device to be adjustable horizontally relative to the build platform, in order to flexibly adapt the build space to the particularly requirements and, in particular, to the particular molding to be constructed, while minimizing the loss of free-flowing material.

The invention additionally relates to a method for constructing a layer body from a plurality of superimposed layers of free-flowing material on a build platform within a build space.

Additional measures which improve the invention are illustrated in greater detail below together with the description of one exemplary embodiment of the invention on the basis of the drawing.

BRIEF DESCRIPTION OF THE DRAWING

Exemplary embodiments of the invention are illustrated below in the drawing and explained in greater detail in the following description. In the drawing.

DETAILED DESCRIPTION OF THE INVENTION

Figure 1:
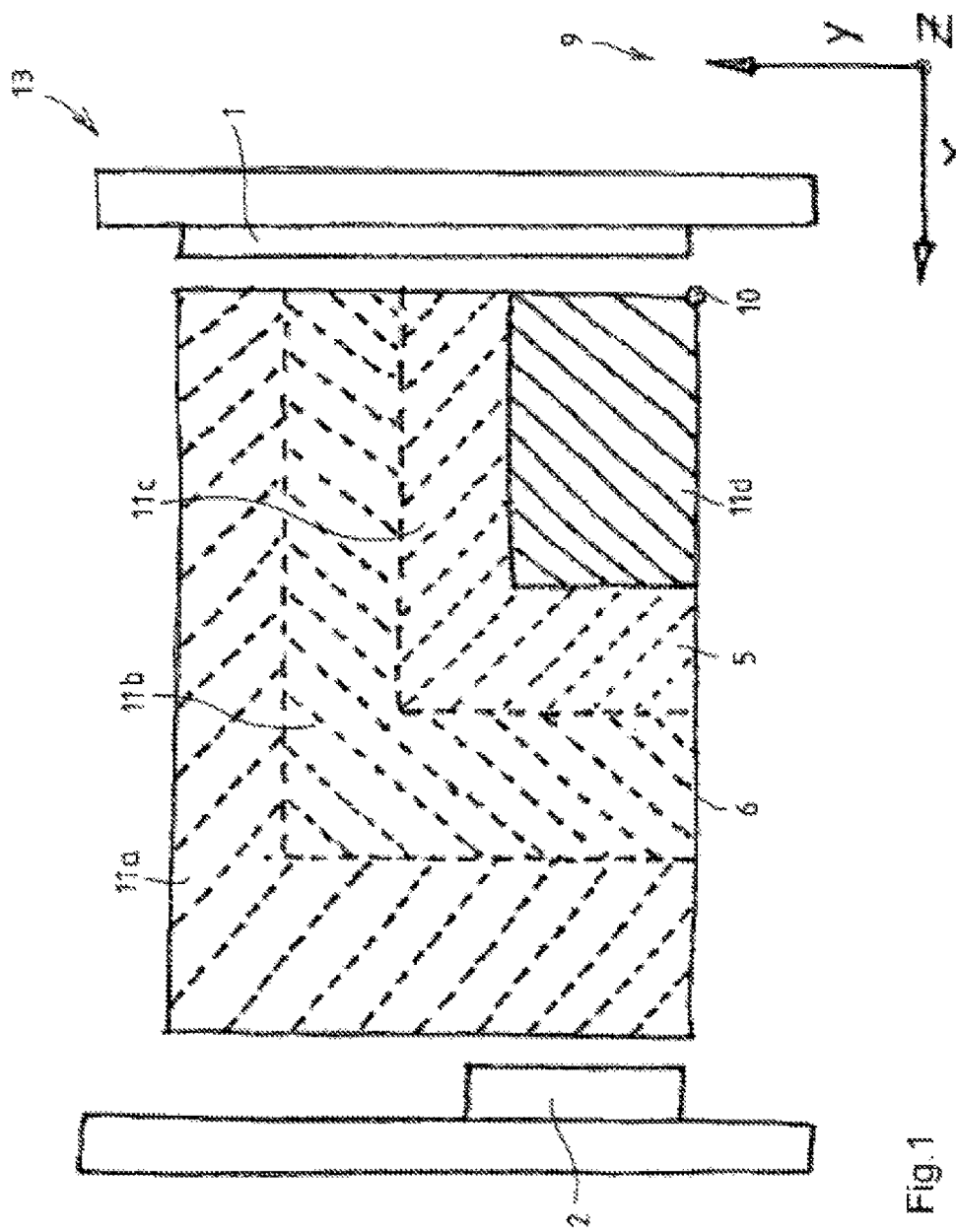
FIG. 1 shows a top view of a device for producing moldings with different build space sizes on a build platform.

FIG. 1 shows a preferred embodiment of a device 13 for constructing a layer body 5 from a plurality of superimposed layers of, for example, powdered, initially loose, particulate material on a build platform 6 within a build space 11a through 11d.

Build spaces 11a through 11d of different sizes illustrated in FIG. 1 extend over a wide area in FIG. 1 parallel to build platform 6 in the horizontal X and Y directions, layer body 5 being constructed in the vertical Z direction, which is perpendicular to the drawing plane in FIG. 1.

Device 13 comprises a discharging device 1 which is movable back and forth over build space 11a through 11d in at least one discharge direction, in this case, for example, in the X direction and/or the Y direction, discharging device 1 having at least one discharge opening 14, which is not visible in this view and from which the particulate material may be discharged in individual superimposed layers during the movement of discharging device 1.

Discharging device 1 is preferably a non-switchable discharging device, i.e., without the option of turning the material flow through discharge opening 14 on and off, so that free-flowing material or particulate material may or may not flow out. Instead, particulate material continuously flows through discharge opening 14 in discharging device 1 unless discharge opening 14 is closed by means belonging to discharging device 1 or if no (more) particulate material is present in a reservoir of discharging device 1.

Device 13 furthermore comprises a print head 2 which is moveable back and forth over build space 11, for example, in the X and Y directions for the selective application of binder onto at least one discharged layer in order to solidify and join together discharged layers in locally predetermined areas of build space 11a through 11d by the action of binders, so that at least one molding 4 is formed by the solidified and joined areas of the layers of layer body 5 in a known manner.

Alternatively, print head 2 could be replaced with a radiation source if the discharged, free-flowing material already contains a binder which is then hardened by selective irradiation with the radiation source for the purpose of creating molding 4. Or the free-flowing material itself is fused or slightly melted by the irradiation and joined thereby.

The extension of build space 11a through 11d in the X and Y directions is predefined by the application of material to build platform 6, different sizes of build spaces 11a through 11d being illustrated in FIG. 1. If build space 11a through 11d is described in the illustrated orthogonal coordinate system 9, each extension or size of build spaces 11a through 11d may be displayed as a rectangle, starting from origin 10. The dimensions of build platform 6 in the X and Y directions then correspond to a maximum displayable size of one build space 11a.

One rectangular side of a build space 11 of this type is generally determined, for example, by the discharge route or discharge travel of discharging device 1 in discharge direction X, so that, in the present case, the size of the build space is dependent on the length of this discharge route. Based on the example in FIG. 1, the discharge route of discharging device 1 thus increases from 11d to 11a in the X direction.

The other rectangular side of a build space 11a through 11d is determined, for example, by the width of discharge opening 14 of discharging device 1 in the Y direction, which may be formed, in particular, by an elongated slot. In the present case, different lengths of discharge openings 14 of discharging device 1 are provided to obtain the variable-length rectangular side of build spaces 11a through 11d in the Y direction. In the present case, therefore, one layer of layer body 5 may, on the whole, be completely produced in one pass of the discharge route in the X direction.

Only one rectangular side of a build field 11 is visible in the cross-sectional side representation in FIGS. 2*a* through 2*d* and 3*a* through 3*g*. In these illustrations, the edges of build space 11 are preferably formed by printed walls 3 in the X and Y directions, i.e., the particulate material is selectively solidified here by print head 2 so that loose particulate material of layer body 5 located within the edges of build space 11 is not able to flow off in areas outside build space 11. For this purpose, print head 2 suitably prints the edge areas of each discharged layer. Alternatively, however, a separate build container or separate build walls could be used to delimit build space 11.

In the embodiments illustrated herein, build platform 6 is preferably lowered as the height of layer body 5 increases in the Z direction, in particular using drives and guides which are not illustrated. Discharging device 1 therefore remains on its initial level for each new layer to be discharged and is therefore movable relative to build platform 6, for example only in the X direction and/or the Y direction. Alternatively, build platform 6 could be designed to be stationary, and at least discharging device 1 could be designed to be movable relative to stationary build platform 6 in both the X and Y directions as well as the Z direction.

In the specific embodiments in FIGS. 2*a* through 2*d* and 3*a* through 3*g*, build platform 6 is vertically adjustable relative to, for example, two bodies 8, 8*a* delimiting the build space in discharge direction X of the discharging device according to the particular progression of construction, in such a way that surfaces of bodies 8, 8*a* facing discharge opening 14 of discharging device 1 are aligned flush with a topmost layer of layer body 5 yet to be produced or already produced.

The purpose of the two bodies 8, 8*a* is to close discharge opening 14 of discharging device 1 and to prevent discharging device 1 from discharging free-flowing material (body 8) or to discharge free-flowing material that is not used for layering into a collecting container 7 (body 8*a*) when discharge opening 14 of discharging device 1 is located above particular body 8, 8*a*.

At least one of bodies 8, 8*a*, in this case preferably body 8, is designed to be adjustable within a horizontal plane parallel to build platform 6 and, in particular, in the X direction, for the purpose of variably delimiting build space 11. The areal extension of build space 11 is then delimited by body 8 at least in the X direction, in particular when the position of body 8 is designed to be movable in discharge direction X of discharging device 1.

Build platform 6 is therefore particularly preferably designed to be adjustable relative to bodies 8, 8*a*, discharging device 1 and print head 2 in the vertical Z direction, and body 8, discharging device 1 and print head 2 are designed to be movable relative to build platform 6 in the horizontal X direction. The position of body 8 is adjusted in the X direction in order to flexibly adapt build space 11 to the particular requirements and, in particular, to the one or more moldings 4 to be constructed, while minimizing losses of free-flowing material.

The two bodies 8, 8*a* are consequently always on the same level in the Z direction, in particular through attachment to or guidance on a stationary frame of device 13, which is not illustrated herein, while build platform 6 is being lowered as the construction of layer body 5 continues to progress.

Bodies 8, 8*a* are preferably flat, plate-shaped bodies, for example metal plates with and without through-openings 12, depending on whether the particular body 8 or 8*a* is to prevent material from being discharged from discharge opening 14 of discharging device 1 or to permit or cause material to be discharged into collecting container 7. Body 8*a* is therefore preferably formed by a perforated plate having at least one through-opening 12. Body 8*a* may furthermore also comprise means for conducting particulate material into collecting container 7. Not least, at least one through-opening 12 of body 8*a* may be controllable, i.e., the at least one through-opening 12 may be opened or closed as a function of external electrical, pneumatic and/or mechanical control signals in order to discharge or conduct free-flowing material not used for layering from discharge opening 14 into collecting container 7 for the purpose of returning it to the layering process.

As indicated above, discharging device 1 is displacement-controlled, for example, by an electronic control unit, which is not illustrated here, with regard to a predefined discharge route in the X direction, extending from an initial, starting or idle position 14 at one edge of build space 11 to a reversing position 16 at the opposite edge of build space 11; i.e., in response to a starting command, it first moves from its starting or idle position 14 in the X direction to reversing position 16, at which the direction of movement is automatically reversed, if necessary upon expiry of a certain dwell time at reversing position 16.

During the movement of discharging device 1 along the discharge route, which simultaneously forms the length of the rectangular side of build space 11 visible herein, particulate material is preferably continuously applied to build platform 6 or to a previously layered part of layer body 5 via discharge opening 14.

Prior to this, discharging device 1, which in this case is, for example, a discharging hopper of a filling device which is not illustrated herein but is easy to picture, is preferably filled with a quantity of particulate material corresponding to a multiple of layers to be applied.

According to the embodiment in FIGS. 2*a* through 2*d*, starting position 15 is predefined by the position of body 8 adjustable in the X direction, while reversing position 16, at which body 8*a* is located, is stationary. In this case, the coating operation is started from the particular set position of body 8, body 8 closing discharge opening 14 of discharging device 1 precisely at starting position 15 and preventing particulate material from being discharged, as is easily pictured on the basis of FIG. 2*a*. Only after discharging device 1 has moved a distance from body 8 is free space the height or thickness of one layer provided below discharge opening 14, into which particulate material may be discharged to form a single layer. Specifically, the following method steps are carried out in the embodiment in FIGS. 2*a* through 2*d*:

Build platform 6 is first positioned in the vertical direction relative to bodies 8 and 8*a*, to discharging device 1 and to print head 2, in such a way that the surfaces of body 8, 8*a* facing discharge opening 14, discharge opening 14 of discharging device 1 and print head 2 are disposed higher than the current topmost layer of layer body 5 by a distance of one layer thickness.

Figure 2A:
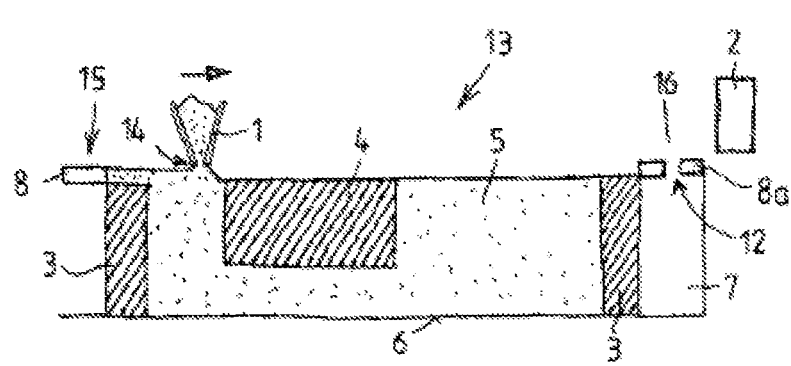
FIGS. 2a through 2d show a schematic cross-sectional view of a device for producing moldings according to one preferred embodiment of the invention.
Figure 2B:
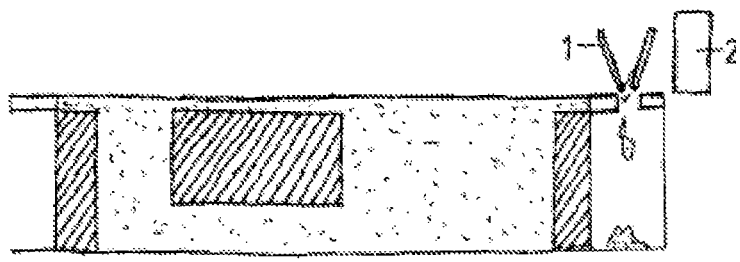

When discharging device 1 is located in its starting position right above body 8, its discharge opening 14 is closed by body 8, as is easily pictured on the basis of FIG. 2*a*. Print head 2 is then preferably located on the far side of opposite reversing position 16 of discharging device 1, i.e., outside build space 11, in order to avoid colliding later on with discharging device 1 once it has reached reversing position 16.

At the same time or thereafter, discharging device 1 is filled with free-flowing material at starting position 15 in a quantity sufficient to produce, for example, a single layer of layer body 5. The filling device, which is not illustrated herein, is then positioned, for example, above discharging device 1.

The control unit then activates discharging device 1 so that it moves from starting position 15 to reversing position 16 while discharging particulate material to construct one layer. This situation is illustrated in FIG. 2a.

Figure 2C:
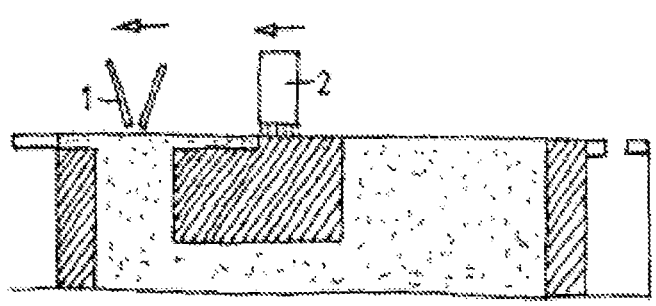

When discharging device 1 has reached body 8a at reversing position 16, discharge opening 14 is located right above opened through-opening 12 in body 8a, so that any excess particulate material still remaining in discharging device 1 for producing a layer is able to flow into collecting container 7, which is disposed, for example, below through-opening 12 in body 8a. The control unit then returns emptied discharging device 1 to its starting position 15, whereby it is followed by print head 2 in order to provide or print binder onto a locally predetermined area of the discharged layer. Since discharging device 1 is empty during this movement, i.e., it is moved without particulate material, an unwanted application of particulate material to layer body 5 is avoided. This operation is illustrated in FIG. 2c.

Figure 2D:
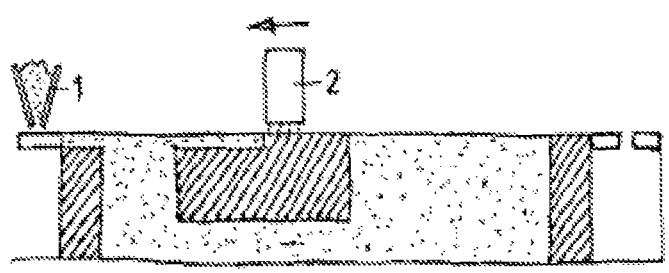

Once discharging device 1 has reached starting position 15, it is refilled with particulate material for one layer, and the described cycle begins all over again (FIG. 2d). The cycle according to FIGS. 2a through 2d are repeated until the entire layer body 5 is created. Print head 2 also prints the areas that represent walls 3 of layer body 5.

In the specific embodiment illustrated in FIGS. 3a through 3g, in contrast to the specific embodiment in FIGS. 2a through 2d, reversing position 16 is determined by the position of body 8 set in the X direction, and starting position 15, where body 8a is located, is stationary. In this case, the coating operation is started at a stationary starting position 15, and reversing position 16 is defined depending on the position of body 8 in the X direction.

Specifically, the following method steps are carried out in the embodiment in FIGS. 3a through 3g:

Build platform 6 is first positioned vertically (in the Z direction) relative to bodies 8, 8a, to discharging device 1 and to print head 2, in such a way that, on the one hand, the surfaces of body 8, 8a facing discharge opening 14 and, on the other hand, discharge opening 14 are disposed higher than the current topmost layer of layer body 5 by a distance of one layer thickness. Body 8a, which has the at least one through-opening 12, and collecting container 7 located thereunder are positioned at starting position 15, and body 8, which does not have a through-opening 12 of this type, is positioned at reversing position 16.

Figure 3A:
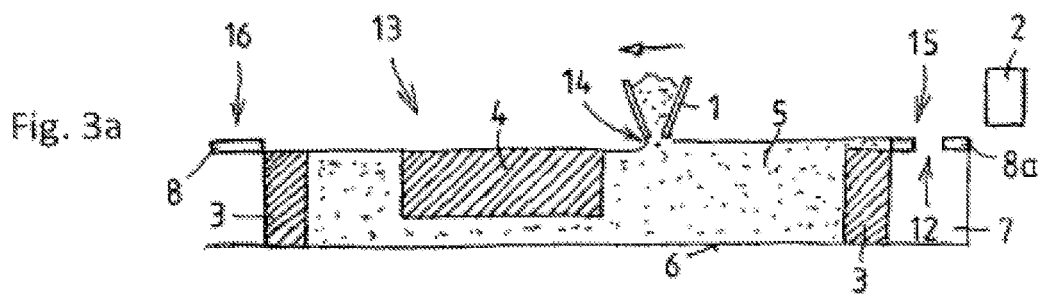
FIGS. 3a through 3g show a schematic cross-sectional view of another embodiment of the invention.
Figure 3B:
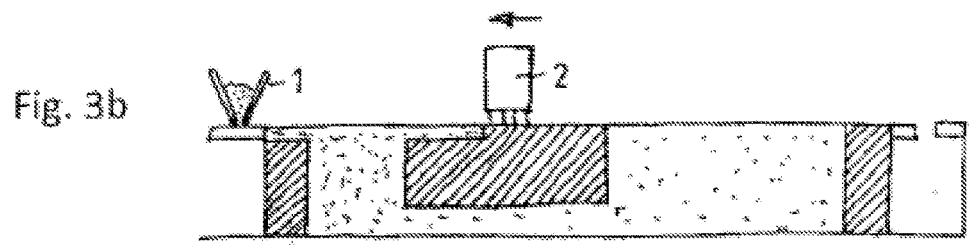
Figure 3C:
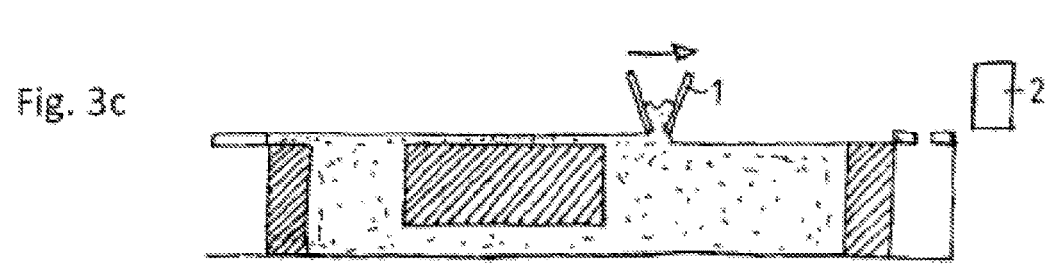
Figure 3D:
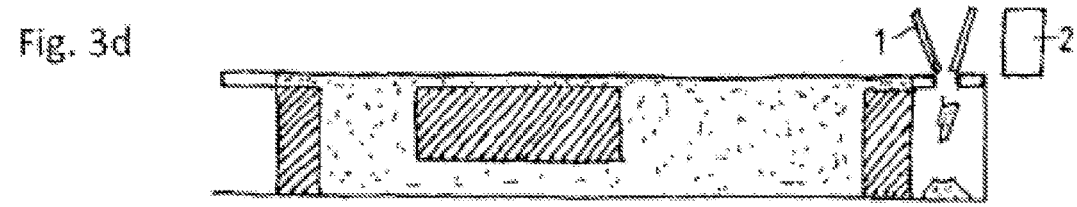
Figure 3E:
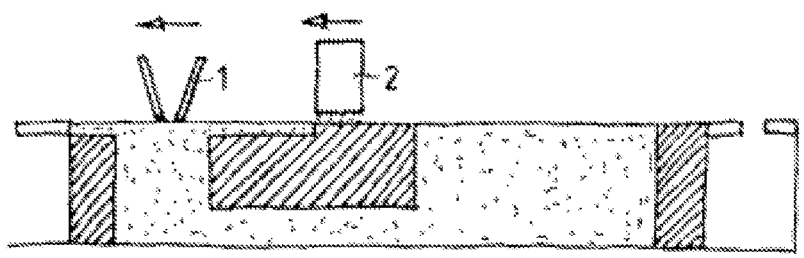
Figure 3F:
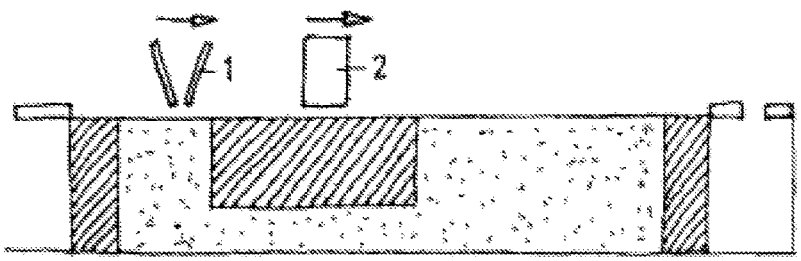
Figure 3G:
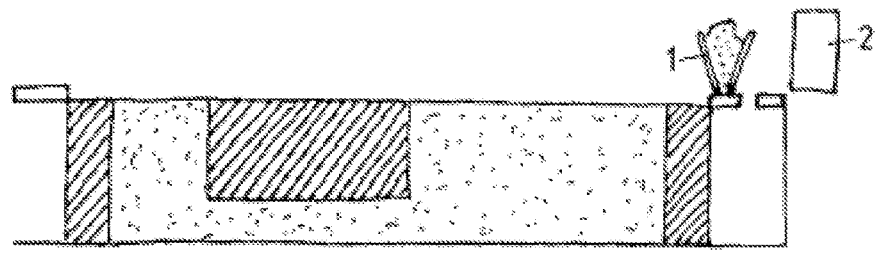

To prevent particulate material from flowing through through-opening 12 in body 8a into collecting container 7 in starting position 15, discharging device 1 is filled by a filling device, which is not illustrated herein, for example in a position located a short distance from starting position 15 in the X direction, in which a part of body 8a facing build space 11 is able to close discharge opening 14 in discharging device 1, as shown in FIG. 3g. Discharging device 1 is filled with particulate material for producing, for example, two layers of layer body 5.

Print head 2 is located in the starting position, preferable on the near side of body 8a, so that it does not collide with discharging device 1. Discharging device 1 is then activated by the control unit in order to move from starting position 15 to reversing position 16 for the purpose of discharging particulate material in this matter to construct a layer (FIG. 3a). Once reversing position 16 at the edge of build space 11 has been reached, body 8 closes discharge opening 14 in discharging device 1. Print head 2 is subsequently activated by the control unit in order to print binder onto a locally determined area of the discharged layer as well as the areas that form walls 3 of layer body 5 (FIG. 3b). Afterwards, print head 2 returns to its starting position.

Once a layer has been discharged and selectively printed, build platform 6 is lowered by a distance of one layer height or one layer thickness so that the surfaces of bodies 8 and 8a facing discharge opening 14, discharge opening 14 of discharging device 1 and print head 2 are again disposed higher than the current topmost layer of layer body 5 by a distance of one layer thickness.

Discharging device 1 is then activated by the control unit in order to move from reversing position 16 back to starting position 15 while discharging particulate material for constructing another layer, as illustrated in FIG. 3c.

After starting position 15 is reached, any particulate material that is not used for the two discharged layers may flow through the at least one through-opening 12 of body 8a into collecting container 7 (FIG. 3d).

Print head 2 is subsequently activated so that it prints binder onto the areas of molding 4 and walls 3 of the additional discharged layer. Emptied discharging device 1 may then move in front of print head 2, as shown in FIG. 3e.

According to FIG. 3f, discharging device 1 and print head 2 are moved back to their starting position 15 after the printing operation, build platform 6 preferably being simultaneously lowered by a distance of one layer height or one layer thickness for the purpose of making space in the vertical direction for a subsequent layering operation.

After discharging device 1 has been refilled with particulate material in the position according to FIG. 3g, the described cycle begins all over again and is repeated until complete layer body 5 is created. Finally, loose particulate material is removed from the layer body in the unprinted areas, leaving molding 4 behind.

Instead of lowering build platform 6 vertically relative to bodies 8, 8a, to discharging device 1 and to print head 2 as the construction continues to progress, bodies 8, 8a, discharging device 1 and the print head could, of course, also be designed to be movable relative to a stationary build platform 6 in the vertical Z direction, according to another embodiment.

LIST OF REFERENCE NUMERALS

1 Discharging device
2 Print head
3 Printed wall
4 Molding
5 Loose particulate material
6 Build platform
7 Collecting container
8 Body
8a Body
9 Coordinate system
10 Coordinate origin
11 Build space
12 Through-opening
13 Device
14 Discharge opening
15 Starting position
16 Reversing position

What is claimed is:

1. A method comprising: the steps of
   i. constructing a first article from a plurality of superimposed layers of a free-flowing material, on a build platform within a first build space, the layers being solidified and joined together in locally predetermined areas, including:
      applying the free-flowing material from a discharge device in layers, and selectively joining the free-flowing material; wherein the discharge device moves back and forth over the first build space; wherein the build platform is stationary and the discharge device is movable with respect to the stationary build platform;
      adjusting the height of the discharge device relative to the stationary build platform; and
      forming one or more outer walls for defining the first build space so that loose free-flowing material within the first build space is prevented from flowing off into areas outside of the first build space; wherein the one or more outer walls are printed walls of the free-flowing material being solidified and joined together;
      wherein the first article is formed by the solidified and joined areas of the layers within the first build space; and
   ii. following the constructing of the first article, repeating (i) for constructing a second article in a second build space, wherein the first build space and the second build space are different build spaces over the build platform.

2. The method of claim 1, wherein the action of a binder solidifies and joins together the free-flowing material in the locally predetermined areas.

3. The method of claim 2, wherein the first article is embedded in loose free-flowing material and the method includes a step of removing the first article from the loose free-flowing material.

4. The method of claim 3, wherein the first article is removed with an extractor prior to step of constructing the second article.

5. The method of claim 3, wherein the binder is applied by a print head.

6. The method of claim 5, wherein the discharge device and the print head both move in the same direction during the step of applying the binder.

7. The method of claim 6, wherein the discharge device applies the free-flowing particulate material at a time when the print head is not applying binder.

8. The method of claim 7, wherein the print head applies the binder at a time when the discharge device is not applying the free-flowing material.

9. The method of claim 8, wherein the free-flowing material is a powder particulate material and the build space is a variable build space for reducing waste of power particulate material.

10. The method of claim 1, wherein fusing solidifies and joins together the layers of the free-flowing material in the locally predetermined areas.

11. The method of claim 1, wherein the method includes a step of irradiating the free-flowing material to solidify and join together the layers of the free-flowing material in the locally predetermined areas.

12. The method of claim 1, wherein the one or more outer walls surround the build space.

13. A method comprising the steps of:
   i. constructing at least one first article from a plurality of superimposed layers of free-flowing material, on a build platform within a first build space, the layers being solidified and joined together in locally predetermined areas by the action of a binder, including:
      applying the free-flowing material from a discharge device in layers, and applying the binder from a print head; wherein the discharge device and the print head move back and forth over the first build space; wherein the build platform is stationary and the discharge device and the print head are movable with respect to the stationary build platform; the discharge device applies the free-flowing material at a time when the print head is not applying binder; and the print head applies the binder at a time when the discharge device is not applying the free-flowing material;
      juxtapositioning the discharge device with an uppermost layer of the free-flowing material; and
      forming an outer wall at an edge of the first build space, the outer wall defining the first build space so that loose free-flowing material within the first build space is prevented from flowing off into areas outside of the first build space; wherein the outer wall is a printed wall of the free-flowing material being solidified and joined together by the action of the binder;
      wherein the at least one first article is formed by the solidified and joined areas of the layers within the first build space; and
   ii. following the constructing of the at least one first article, repeating (i) for constructing at least one second article in a second build space, wherein the first build space and the second build space are different build spaces over the build platform;
   wherein a layer is completed in one pass of the discharge device over the build space.

14. The method of claim 13, wherein the build space is variable for reducing waste of the free-flowing material.

15. The method of claim 14, wherein the step of applying the free-flowing particulate material and the binder includes moving the print head and the discharge device together in a first direction; and then moving the print head and the discharge device together in a second direction opposite the first direction.

16. The method of claim 13, wherein the discharge device includes has an elongated shape for applying a layer of the free-flowing material in a single pass of the discharge device over the build space.

17. The method of claim 13, wherein the first build space is enclosed by one or more printed walls including the outer wall, wherein the one or more printed walls enclosing the first build space are generally vertical and free of support by a solid support structure outside of the first build space.

18. A method comprising the steps of:
   i. constructing at least one first article from a plurality of superimposed layers of free-flowing particulate material, on a build platform within a first build space, the layers being solidified and joined together in locally predetermined areas by the action of a radiation source, including:
      applying the free-flowing particulate material from a discharge device in layers, and applying radiation from a radiation source; wherein the discharge device and the radiation source move back and forth over the first build space; wherein the build platform is stationary and the discharge device is movable with respect to the stationary build platform;

adjusting the height of the discharge device relative to the stationary build platform;

juxtapositioning the discharge device with an uppermost layer of the free-flowing particulate material; and forming an outer wall at an edge of the first build space, the outer wall defining the build space so that loose free-flowing particulate material within the first build space is prevented from flowing off into areas outside of the first build space; wherein the outer wall is a printed wall of the free-flowing particulate material being solidified and joined together by the action of the radiation source;

wherein the at least one first article is formed by the solidified and joined areas of the layers within the first build space; and ii. following the constructing of the at least one first article, repeating (i) for constructing at least one second article in a second build space, wherein the first build space and the second build space are different build spaces over the build platform.

19. The method of claim 18, wherein the radiation source selectively irradiates the free-flowing particulate material for fusing layers of the free-flowing particulate material.

20. The method of claim 18, wherein the free-flowing particulate material includes a binder and the radiation source selectively solidifies and joins the layers by the action of the irradiation of the binder.

21. The method of claim 18, wherein the first article is embedded in the loose free-flowing particulate material and the method includes a step of extracting the first article from loose free-flowing particulate material.

22. The method of claim 18, wherein the discharge device has an elongated shape for applying a layer of the free-flowing material in a single pass of the discharge device over the build space.

* * * * *